United States Patent Office 3,317,615
Patented May 2, 1967

3,317,615
PROCESS FOR THE PREPARATION OF PERFLUORO-TERTIARY-ALKANOL
Donald P. Graham, Wilmington, Del., assignor to E. I. du Pont de Nemours and Company, Wilmington, Del., a corporation of Delaware
No Drawing. Filed Sept. 1, 1964, Ser. No. 393,755
8 Claims. (Cl. 260—633)

This invention is directed to a novel process for the preparation of perfluoro-tertiary-alkanols.

In the past, preparation of perfluoro-tertiary-alkanols has been accomplished by the reaction of perfluoroacids or perfluoroketones with the Grignard reagents of perfluoroalkyl iodides or perfluoroalkyl bromides. Similarly, the perfluoro-tertiary-alkanols have been prepared by the reaction of perfluoroacids or perfluoroketone with perfluoroalkyl lithium compounds. Another method heretofore used for preparing these compounds involves the reaction of perfluoroketones with an alkali metal alkoxide. However, by experience it has become recognized in the art that none of these processes are completely satisfactory because of various disadvantages. For example, the preparation of the Grignard reagents or lithium compounds used in these processes is difficult and requires the expensive perfluoroalkyl iodides as starting materials. Furthermore, when Grignard reagents or lithium compounds are used, low reaction temperatures are required in order to prevent undesirable side reactions. The reaction involving alkali metal alkoxides is undesirable since a portion of the perfluoroketone is lost when converted to the alkyl ester of a perfluorocarboxylic acid.

Only the perfluoro-tertiary-alkanols combine the unique characteristics of being both completely fluorinated and completely stable to oxidation. The perfluoro-primary and secondary alkanols $R_fCF_2OH$ and $R_fCF(OHR'_f)$, although completely fluorinated, are not stable. These alkanols lose HF readily in the presence of bases to form other materials. Upon losing HF, the perfluoro-primary alkanol forms an acid derivative and the secondary perfluoro alkanol forms a ketone derivative. Indeed, while $R_fCF(OH)R'_f$ is sufficiently stable to be distilled in many cases, $R_fCF_2OH$ is so unstable that it cannot be isolated at all. On the other hand, the stable alkanols $R_fCH_2OH$ and $R_fCH(OH)R'_f$ are not completely fluorinated. Since these alkanols contains replaceable hydrogen, they do not posses the desirable property of being insensitive to oxidizing agents. The perfluoro-tertiary-alkanols of this invention, therefore, being free of hydrogen other than the hydroxyl hydrogen, can be used in situations where oxidizing agents are present and where the alkanols $R_fCH_2OH$ and $R_fCH(OH)R'_f$ fail because they oxidize readily to ketones or acids.

It is, therefore, an object of this invention to provide a novel and efficient process for the preparation of perfluoro-tertiary-alkanols.

More specifically, the present invention is directed to a process for preparing perfluoro-tertiary-alkanols of structure

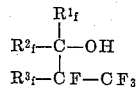

wherein $R^1_f$ and $R^2_f$ are perfluoroalkyl groups and $R^3_f$ is either fluorine or trifluoromethyl. The process for preparing these compounds involves two steps. The first step comprises contacting at about 20° C. to about 175° C. a perfluoroketone of the structure $$R^1_f\text{—}CO\text{—}R^2_f$$

with a perfluoroolefin of the structure $$R^3_fCF=CF^2$$

and MF, wherein M represents an alkali metal, in a specific solvent ($R^1_f$, and $R^2_f$ and $R^3_f$ being the same as above). The product of this first step is the alkali metal salt of the above-defined perfluoro-tertiary-alkanol. The solvent must have a melting point below 20° C. and is chosen from either polyethers having the structure $$RO(C_pH_{2p}O)_nR$$

or nitriles having the structure $R'CN$, wherein R is a lower alkyl group of one to four carbon atoms, $p$ is an integer of two to four $n$ is an integer of one to four, and $R'$ is a hydrocarbon group free of aliphatic unsaturation. The second step of the present novel process converts the alkali metal salt of said perfluoro-tertiary-alkanol formed in step 1 to the free perfluoro-tertiary-alkanol.

The present process, consisting of the reaction of a perfluoroketone $R^1_f\text{—}CO\text{—}R^2_f$ with a perfluoroolefin $$R^3_fCF=CF^2$$

and an alkali metal fluoride as defined above, is illustrated by Equation 1 below.

(1)
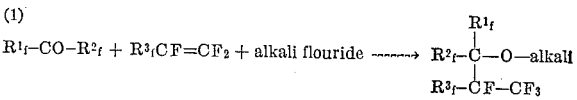

This reaction is carried out in a solvent at a temperature from 20° C. to 175° C. The alkali metal salt of Equation 1 is then converted to the free perfluoro-tertiary-alkanol as illustrated by Equation 2 below.

(2)
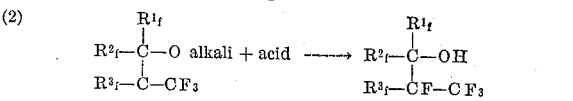

This second reaction is carried out by contacting the alkali metal salt of Equation 1 with an acid and separating the thus formed free carbinol from the reaction mixture. The two steps of the present process are discussed in more detail below.

The perfluoroketones used as starting materials in the first step have the structure $R^1_f\text{—}CO\text{—}R^2_f$ wherein $R^1_f$ and $R^2_f$ are perfluoroalkyl groups. These ketones contain from three to twenty-one carbon atoms. It is preferred that the perfluoroalkyl groups $R^1_f$ and $R^2_f$ each contain the group $-CF_2-$ or $-CF_3$ adjacent to the carbonyl group. The preferred perfluoroketones therefore have the structure $F(CF_2)_m\text{—}CO\text{—}(CF_2)_nF$ wherein $m+n=2$ to 20, $m$ and $n$ each being at least one. The most preferred perfluoroketone is hexafluoroacetone. Other useful ketones are $CF_3CF_2\text{—}CO\text{—}CF_3$, $$CF_3CF_2\text{—}CO\text{—}CF_2CF_3 \quad F(CF_2)_4\text{—}CO\text{—}CF_3,$$

$$F(CF_2)_6\text{—}CO\text{—}CF_3F(CF_2)_4\text{—}CO\text{—}(CF_2)_4F,$$

$$F(CF_2)_6\text{—}CO\text{—}(CF_2)_2F \quad F(CF_2)_6\text{—}CO\text{—}(CF_2)_4F,$$

$F(CF_2)_6\text{—}CO\text{—}(CF_2)_6F$ and $F(CF_2)_8\text{—}CO\text{—}(CF_2)_8F$.

Perfluoroketones such as $$(CF_3)_2CFCF_2\text{—}CO\text{—}CF_2CF(CF_3)_2$$

may be used but are less reactive.

The perfluoroolefines utilized as starting materials in the first step have the structure $R^3_fCF=CF_2$, wherein $R^3_f$ is either $CF_3$ or fluorine. Hence, the perfluoroolefins are either hexafluoropropylene ($CF_3CF=CF_2$) or tetrafluoroethylene ($CF_2=CF_2$). Tetrafluoroethylene is preferred. Accordingly, the perfluoro-tertiary-alkanol products of the present invention always contain either the group $-CF_2CF_3$ or the group

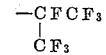

The third reactant in the first step of the process is an alkali metal fluoride, i.e., lithium fluoride, sodium fluoride, potassium fluoride, rubidium fluoride and cesium fluoride. Cesium fluoride is the most reactive of the group but potassium fluoride is considerably more economical. It is generally preferable that the alkali metal fluoride be added to the reaction mixture in finely divided form. Although it is preferable that the alkali metal fluoride be anhydrous, small amounts of water can be tolerated in the reaction mixture.

Other fluorides such as hydrogen fluoride, ammonium fluoride, mercuric fluoride, aluminum fluoride, boron fluoride or combinations containing free hydrogen fluoride with alkali metal fluorides are not useful in the present process. The alkali metal bifluorides such as sodium or potassium bifluorides ($NaHF_2$ or $KHF_2$) do not inhibit the reaction because, although they contain hydrogen fluoride, the hydrogen fluoride is not free in such compounds.

In order to obtain as complete a conversion as possible, it is preferred to react equimolar amounts of the alkali metal fluoride, the perfluoroketone and the perfluoroolefine. Conversion in the first step of this process is limited by the reagent present in the least molar amount. Thus, when molar equivalent amounts are not used and the mole ratio of the alkali metal fluoride to perfluoroketone is more than one, conversion of the perfluoroketone to perfluoro-tertiary-alkanol is high but the excess alkali metal fluoride causes polymerization of the perfluoroolefine. When the molar ratio of alkali metal fluoride to perfluoroketone is less than one, conversion of the perfluoroketone is decreased accordingly but perfluoroolefine poylmers do not form.

The useful solvents for the first step of the present process are the polyethers $RO(C_pH_{2p}O)_nR$ or the nitriles R′CN. In the polyethers, R is a lower alkyl group of one to four carbons, $p$ is an integer of two to four and $n$ is an integer of one to four. Examples of polyethers within this definition which are utilized in the present process are $CH_3OCH_2CH_2OCH_3$, $CH_3O(CH_2CH_2O)_2CH_3$, $CH_3O(CH_2CH_2O)_3CH_3$, $CH_3O(CH_2CH_2O)_4CH_3$
$C_2H_5O(CH_2CH_2O)_2C_2H_5$, $C_2H_5O(CH_2CH_2O)_4C_2H_5$
$C_4H_9O(CH_2CH_2O)_2OC_4H_9$, $CH_3O(C_3H_6O)_2CH_3$
$C_2H_5O(C_3H_6O)_4C_2H_5$, $CH_3O(CH_2)_4OCH_3$ and $CH_3O[(CH_2)_4O]_2CH_3$. In the nitriles R′CN, R′ is a hydrocarbon group free of aliphatic unsaturation. Thus, R′ may be an alkyl including cycloalkyl group, an aromatic group, aralkyl group or an alkaryl group. The nitriles should have melting points lower than 20° C. to be useful solvents. Some useful examples are acetonitrile, propionitrile, butyronitrile, valeronitrile, capronitrile, caprylonitrile, caprinitrile, lauronitrile, benzonitrile, o-tolunitrile, m-tolunitrile, phenylacetonitrile and hexahydrobenzonitrile.

The preferred solvents used in the present process are $CH_3O(CH_2CH_2O)_nCH_3$ and $C_2H_5O(CH_2CH_2O)_nC_2H_5$ where $n$ is 2, 3 or 4 and acetonitrile. It is a preferred, as with the catalysts, that the solvent be dry although small amounts of water can be present. Benzene and similar hydrocarbons which are soluble in the above-defined solvents may be present in the process. However, other solvents which contain active hydrogen are not useful because they inhibit the desired reaction. It is required that sufficient solvent be used to partially dissolve the reactant alkali metal fluoride MF.

As is well known, the perfluoroketones react with water to form stable hydrates which cannot react in the present process. In order to minimize this yield loss, the amount of water in the reaction should be kept below about 10 mole percent of the perfluoroketone present. It is to be understood, however that as long as some free perfluoroketone is present, the reaction of Equation 1 above will occur, regardless of the amount of perfluoroketone hydrate which may be present.

The reaction temperature for the first step of the present process may vary from about 20° C. to about 175° C. At 20° C. the reaction is quite slow and below 20° C. it becomes so slow as to be impractical. The reaction of Equation 1 above is known not to occur above about 175° C. The preferred reaction temperature varies with the particular alkali metal fluoride being used. The reactivity of the alkali metal fluorides seems to vary inversely with the atomic weight of the alkali metal. The preferred temperature with the very reactive cesium fluoride is from 80° C. to 125° C. For the somewhat less reactive potassium fluoride the prefered reaction temperature is from 100° C. to 150° C. For the lesser reactive fluorides such as sodium fluoride the preferred reaction temperature is 125° C. to 175° C.

The reaction pressure is not a critical limitation. Subatmospheric, atmospheric or superatmospheric pressures can be used for the reaction. Since the perfluoroolefines, tetrafluoroethylene and hexafluoropropylene and certain perfluoroketones such as hexafluoroacetone are gases or low boiling liquids at reaction temperatures, the concentration of these reactants in the reaction mixture, and hence the reaction rate, is increased by using higher pressures. In general, pressures up to about 1000 p.s.i.g. may be used. Tetrafluoroethylene may be hazardous when heated at high pressures without inhibitors, so pressures of 200 p.s.i.g. or below are preferable when tetrafluoroethylene is a reactant.

Materials of construction seem to have no effect on the course of the reaction of Equation 1 above; hence, any reaction equipment suitable for use at the chosen reaction temperatures and pressures may be used in the present invention.

Tetrafluoroethylene is usually stored containing a polymerization inhibitor such as limonene or "Terpene-B" (a mixture of limonene, terpinene and terpinolene). The inhibitor has no effect on the reaction and need not be removed although it may be removed if so desired. For reasons of safety, it is preferred not to remove the inhibitor.

The product of the reaction of the first step in the present process is the alkali metal salt of the perfluoro-tertiary-alkanol, i.e.,

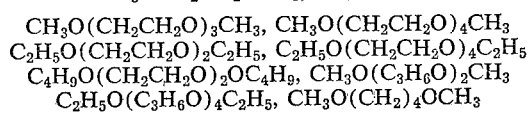

The salts of high atomic weight alkali metals such as cesium are usually soluble in the defined reaction solvents. On the other hand, the lower atomic weight alkali metal salts such as the sodium or potassium salts are generally less soluble in the reaction solvents. The less soluble salts may be recovered by simple filtration or the like. Isolation of the soluble salts may be carried out by partial evaporation of the solvent. When isolated by either of these methods, the solid alkali metal salts retain considerable adsorbed solvent which is easily removed by means normally used to eliminate adsorbed solvents. However, if the alkali metal salts are desired as intermediates, as for preparation of esters, the adsorbed solvent will not interfere and no attempt need be made to remove it. In those cases where the salt is useful as an intermediate, it is not necessary to convert the salt to the free perfluoro-tertiary-alkanol. If the salts are to be converted to the free alkanols, it is usually easier to convert the salt to the alkanol and then remove the adsorbed solvent from the alkanol.

If the free perfluoro-tertiary-alkanols are desired per se or if they are to be used as intermediates in reactions requiring the free alkanol rather than the salt, the salts are treated with a strong acid thereby converting the salt to the free alkanol. These perfluoro-tertiary-alkanols are quite acidic, even more so than the primary and secondary alkanols $R_fCH_2OH$ and $(R_f)_2CHOH$. The subject alkanols have approximately the same acid strength as phenol. Indeed, the tertiary-alkanols are sufficiently acidic to form ammonium salts with ammonia.

Strong acids such as mineral acids are preferred for converting the salts to the free tertiary-alkanols. A preferred method is to treat the salt of the perfluoro-tertiary-alkanol with an aqueous solution of a mineral acid such as sulfuric acid, then to separate the free tertiary-alkanol from the aqueous solution. Volatile tertiary-alkanols are readily distilled or steam distilled from the aqueous acid solution. Nonvolatile tertiary-alkanols are water immiscible and may be separated by decantation, filtration or similar well-known methods in the art.

Due to the high acidity of the perfluoro-tertiary-alkanols, they tend to retain or complex strongly with solvents such as water, the polyethers $RO(C_pH_{2p}O)_nR$ or the nitriles $R'CN$. Careful fractionation of the volatile tertiary-alkanols using highly efficient fractionation equipment is sufficient to recover the alkanols in most cases and for most purposes. The nonvolatile perfluoro-tertiary-alkanols may be recovered by vacuum drying and like methods well known in the art.

If chemically pure perfluoro-tertiary-alkanols are required or desired, it may be necessary or more convenient to resort to special purification methods rather than using solely fractional distillation. This is particularly the case when the alkanols are produced on a large scale where highly efficient fractional distillation is difficult and expensive. In such cases, small amounts of water and the polyethers are readily removed from the perfluoro-tertiary-alkanols by treating with concentrated sulfuric acid. The volatile tertiary-alkanols are easily distilled from concentrated sulfuric acid. The nonvolatile tertiary-alkanols are extracted with concentrated sulfuric, then treated with an adsorbing agent to remove the remaining small amounts of sulfuric acid.

When the perfluoro-tertiary-alkanols contain adsorbed or complexed nitriles $R'CN$, treatment with concentrated sulfuric acid is less useful. A method which has been found more useful in this situation is to reflux the perfluoro-tertiary-alkanol with an aqueous alkali, such as aqueous sodium hydroxide, which hydrolyzes the nitrile to the alkali salt of the acid $R'CO_2H$. The immiscible perfluoro-tertiary-alkanol is then separated from the aqueous solution and dried by treatment with concentrated sulfuric acid as described above.

Other methods than those described above are available for converting the salts of the perfluoro-tertiary-alkanols to the free alkanols. For example, the soluble cesium salts of the perfluoro-tertiary-alkanols may be passed over a cation exchange resin in the acid form, then treated with concentrated sulfuric acid to remove water and solvent. The perfluoro-tertiary-alkanols may, in some cases, be freed of solvent by conversion to the ammonium salts with ammonia. The ammonium salts are volatile and readily separate from solvents. The ammonium salts are then easily reconverted to the free perfluoro-tertiary-alkanols by treatment with a nonvolatile strong acid.

The particular method of isolation and purification of the product perfluoro-tertiary-alkanols or the alkali metal salts of these alkanols is not a limitation of the present invention since, in addition to those described above, other methods of isolation and purification of the products will be apparent to those skilled in the art.

Representative examples illustrating the present invention follow. All parts are by weight unless otherwise specified.

EXAMPLE 1

A mixture was prepared by slurrying under dry conditions 100 parts cesium fluoride and 200 parts diethyleneglycol dimethyl ether $[CH_3O(CH_2CH_2O)_2CH_3]$ in the absence of air in a pressure vessel made of glass. Thereafter, 108 parts of hexafluoroacetone were added at room temperature in increments so that the pressure did not exceed 25 p.s.i.g. Observing the designated pressure, the incremental addition required 20 hours. The reaction mass was then heated to 100° C. and 65 parts tetrafluoroethylene were added in increments, maintaining the internal pressure below 25 p.s.i.g. at 95–100° C. The incremental addition of tetrafluoroethylene required 50 hours.

The reaction mass was cooled and the greater part of the solvent removed by evaporation at room temperature at 0.1–0.3 mm. pressure. The resulting cake was slurried in 150 parts of cold (0° to 5° C.) 96% sulfuric acid. The product was distilled off rapidly at atmospheric pressure at pot temperatures up to 160° C. The distillate amounted to 160 parts and was a water white liquid boiling at 67° C. The distillate was shown by its nuclear magnetic resonance spectrum to be predominantly perfluoro(dimethylethyl)carbinol $(CF_3)_2C(OH)CF_2CF_3$.

EXAMPLE 2

A slurry of 15.2 parts cesium fluoride and 30 parts diethyleneglycol dimethyl ether was prepared as in Example 1. Then 21 parts of perfluorobutanone-2 were added at room temperature over a period of 5.5 hours. The reaction mass was then heated to 100° C. and 38 parts of tetrafluoroethylene were added over a period of 40 hours while the pressure was maintained below 25 p.s.i.g. The reaction mass was then cooled and filtered to remove unreacted cesium fluoride. The filtrate was thereafter evaporated at 50–55° C. at less than 0.5 mm. pressure. The resulting cake, amounting to 42 parts, was cooled with an ice-water bath and combined with 92 parts of cooled concentrated sulfuric acid. The mixture was maintained at a temperature below 10° C. during the addition of sulfuric acid. Thereafter, the product of this reaction was quickly distilled into a liquid nitrogen cooled receiver at reduced pressure (less than 20 mm.), using pot temperatures up to 92° C. The recovered product was redistilled, giving 26.1 parts (77.7% yield) of perfluoro(methyldiethyl)carbinol $(CF_3CF_2)_2C(OH)CF_3$, having a boiling point of 87.5° C. The structure of the product was confirmed by its nuclear magnetic resonance spectrum.

EXAMPLE 3

In the manner similar to the procedures used in Examples 1 and 2, a slurry of 22.8 parts cesium fluoride and 40 parts diethyleneglycol dimethyl ether was prepared, then 40 parts of perfluoropentanone-3 were added as a gas over a period of several hours. The reaction mass was heated to 100° C. and 15.5 parts of tetrafluoroethylene were added over a period of 15.5 hours while the pressure in the vessel was maintained below 25 p.s.i.g. The reaction mass was then cooled and filtered. The filtrate was thereafter evaporated at 55–60° C. at less than 0.5 mm., giving 52 parts of cake. The cake was chilled in an ice-water bath and combined with 138 parts concentrated sulfuric acid while the temperature was maintained below 10° C. The product was quickly distilled into a liquid nitrogen cooled receiver as in Example 2, using a pot temperature up to 100° C. and reduced pressures (less than 5 mm.). The recovered crude product amounted to 37 parts which was thereafter fractionally distilled under reduced pressure, giving 34.6 parts (60% yield) of perfluoro(triethyl)carbinol $(CF_3CF_2)_3COH$, having boiling points of 48–49° C./100 mm. and 104–105° C./atmospheric pressure. The structure of the product was confirmed by its nuclear magnetic resonance spectrum.

EXAMPLE 4

A stainless steel autoclave (volume 1000 parts water) was charged with 300 parts diethyleneglycol dimethyl ether (containing 0.13% water) and 237 parts of commercial cesium fluoride (99.5% pure). Reasonable care was taken to prevent exposure to the atmosphere. After flushing with dry nitrogen, 210 parts of hexafluoroacetone were added to the autoclave over a period of one hour in 40 part increments at 30–40° C. To maintain the temperature, cooling was required. The reaction mass was then heated to 90° C. and 299 parts tetrafluoroethylene were added (containing the polymerization inhibitor) in 30 part increments over a two hour period. The pressure varied between 150 and 60 p.s.i.g. The mass was maintained at 100° C. for one hour after the addition was complete. In this example, a molar excess of cesium fluoride over hexafluoroacetone was used.

The reaction mass was cooled to 25° C. and discharged from the autoclave. It consisted of two layers which were separated. The upper layer, containing the cesium salt of the product, was combined with 2500 parts water and 50 parts boric acid, then 180 parts of concentrated sulfuric acid were added. (The boric acid inhibits attack of HF formed from excess cesium fluoride on glass equipment.) The mas was steam distilled, giving 434 parts of pale yellow liquid immiscible with water, consisting of a mixture of the product alcohol and diethyleneglycol dimethyl ether. Two-hundred parts of the yellow liquid were combined with 475 parts 96% sulfuric acid at 20–30° C., then distilled, giving 126 parts (76% over-all yield) of perfluoro(dimethylethyl)carbinol of 99% purity. Perfluoro(dimethylethyl)carbinol is immiscible with water but readily soluble in dilute aqueous ammonia or sodium hydroxide. From 28% aqueous ammonia, it crystallizes as the ammonium salt $(CF_3)_2C(ONH_4)CF_2CF_3$ which is very volatile when dry. The ammonium salt is readily converted to the free alcohol by distilling from concentrated sulfuric acid.

The lower layer of the reaction mixture discharged from the autoclave contained liquid polymers of tetrafluoroethylene and was not further processed.

EXAMPLE 5

One hundred and eighty-four parts of diethyleneglycol dimethyl ether (dried by distillation from lithium aluminum hydride) and 64 parts cesium fluoride were placed in a "Hastelloy C" lined pressure tube of a 450 volume water capacity. The tube was cooled to −60° C., evacuated to 5 mm. pressure and then 133 parts hexafluoroacetone were added. The resulting mass was heated at 100° C. for six hours with agitation. The tube was then cooled to 25° C. and excess pressure vented (86 parts hexafluoroacetone remained). The reaction mass was then heated to 125° C. and 55 parts tetrafluoroethylene were added in 5–10 part increments over a twelve-hour period. The pressure during the addition of tetrafluoroethylene ranged between 170–360 p.s.i.g. In this example, a molar excess of hexafluoroacetone over cesium fluoride was used.

The pressure tube was cooled to 25° C., excess pressure was vented (3 parts of gases were collected) and the contents discharged. Only one layer was obtained. Most of the solvent was removed by evaporation under vacuum at temperatures up to 100° C. The pale yellow residue (198 parts) was stirred into 2000 parts water and the solution acidified with sulfuric acid, then steam distilled. The water immiscible distillate (140 parts) was mixed with 380 parts concentrated sulfuric acid and fractionally distilled, giving 80 parts (69% yield) of perfluoro(dimethylethyl)carbinol, having a boiling point of 65–67° C. and a purity of 99%.

EXAMPLE 6

Ninety parts diethyleneglycol dimethyl ether (dried as in Example 5) and 45 parts of commercial, anhydrous potassium fluoride were placed in a pressure tube (volume 450 parts water). After cooling to −60° C. and evacuating the tube as in Example 5, 66 parts hexafluoroacetone and 60 parts of tetrafluoroethylene were added. The tube was heated to 125° C. with agitation under autogenous pressure and maintained at that temperature for 2 hours. Then the tube was heated for 12 hours at 150° C. The reaction mass was then cooled to 25° C. and the unreacted gases (15 parts) vented.

The remaining reaction mass was combined with 2000 parts water and 75 parts concentrated sulfuric acid and steam distilled, giving 98 parts of a water immiscible liquid. This liquid was distilled from 150 parts concentrated sulfuric acid and then redistilled from 40 parts concentrated sulfuric acid, giving perfluoro(dimethylethyl)carbinol, having a boiling point of 65–67° C., in 36% yield.

EXAMPLE 7

Seventy-eight parts of acetonitrile (containing 0.13% water) and 40 parts anhydrous potassium fluoride were placed in a shaker tube of 450 volume water capacity. After cooling to −65° C. and evacuating the tube, 66 parts of hexafluoroacetone and 60 parts tetrafluoroethylene were added. The reaction mass was heated with agitation for two hours at 125° C. and then for ten hours at 150° C. The reaction mass was thereafter cooled to 25° C., the unreacted gases (19 parts) vented and the remaining mass combined with 1500 parts water containing 120 parts sodium hydroxide. This mixture was heated under reflux for four hours, cooled acidified with sulfuric acid and steam distilled, giving 76 parts (87.3% pure, yield 58.3%) of perfluoro(dimethylethyl)carbinol. Redistillation from 180 parts concentrated sulfuric acid gave 45 parts of pure perfluoro(dimethylethyl)carbinol (yield 39% over-all).

Using the same reactants as above, similar results were obtained when acentonitrile was used as the reaction solvent and reaction temperatures of 125° C. were employed, when diethyleneglycol dimethyl ether was used as the reaction solvent and reaction temperatures of 175° C. and 150° C. were employed. However, no carbinol product was obtained using potassium fluoride in liquid hydrogen fluoride solvent at temperatures up to 200° C.

EXAMPLE 8

A mixture of 95 parts diethyleneglycol dimethyl ether, 45 parts potassium bifluoride ($KHF_2$) and 5 parts cesium fluoride was placed in a shaker tube. After cooling the mixtures to about −40° C. and evacuating the tube, 92 parts of hexafluoroacetone and 55 parts tetrafluoroethylene were added to the mixture. The mass was heated at 150° C. for six hours. After cooling to 0° C., unreacted gases (18 parts) were vented and the mass was combined with water acidified with sulfuric acid. The oil (44 parts) remaining after several extractions with aqueous sulfuric acid was distilled from 90 parts sulfuric acid, giving 12 parts of pure perfluoro(dimethylethyl)carbinol.

When cesium fluoride was omitted from the above procedure, only a trace amount of the carbinol was detected.

EXAMPLE 9

A mixture of 94 parts diethyleneglycol dimethyl ether and 25 parts micropulverized sodium fluoride was placed in a shaker tube. After cooling the mixture to −60° C. and evacuating the tube, 66 parts of hexafluoroacetone and 60 parts of tetrafluoroethylene were added to the mixture. The resulting mass was heated under autogeneous pressure at 125° C. for two hours, 150° C. for four hours, and then at 175° C. for four hours. After cooling and venting unreacted gases, the remaining mass was combined with dilute sulfuric acid and steam distilled, giving 29 parts of distillate. The distillate was redistilled from 85 parts concentrated sulfuric acid, giving perfluoro(dimethylethyl)carbinol.

If lithium fluoride or rubidium fluoride are substituted for the sodium fluoride catalyst in the above procedure and the reaction temperatures adjusted to suit the particular catalyst, substantially the same results are obtained.

EXAMPLE 10

A mixture of 16 parts sodium bifluoride ($NaHF_2$), 7 parts cesium fluoride and 150 parts tetramethyleneglycol dimethyl ether was placed in a shaker tube. The tube was cooled, evacuated and 46 parts of hexafluoropropylene and 42 parts hexafluoroacetone were added. The reaction mass was heated for three hours at 100° C. The mass was then vented and discharged. The discharged mass was combined with dilute sulfuric acid and steam distilled, giving 5 parts of a pale yellow liquid which was redistilled from 40 parts concentrated sulfuric acid. Two parts of perfluoro(dimethylisopropyl)carbinol

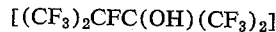

[$(CF_3)_2CFC(OH)(CF_3)_2$]

having a boiling point of 90–92° C., were obtained. The structure of the product was confirmed by its infrared and nuclear magnetic resonance spectra.

The yield of carbinol in this example can be accounted for by the amount of cesium fluoride present. Hence, the sodium bifluoride, although it does not inhibit the reaction, does not appear to be useful in catalyzing the reaction.

EXAMPLE 11

A mixture of 11 parts benzonitrile and 38 parts commercial, anhydrous potassium fluoride was placed in a shaker tube having a capacity of 450 volumes of water. After cooling the mixture to −60° C. and evacuating the tube, 66 parts of hexafluoroacetone and 60 parts of tetrafluoroethylene were added. The resulting mass was heated under autogenous pressure at 125° C. for two hours, and then at 150° C. for twelve hours. After cooling to 0° C., the unreacted gases, which measured 47 parts, were vented and the remaining mass combined with 2000 parts water and 80 parts sodium hydroxide. This mixture was heated under reflux for twelve hours. The mixture was then acidified with sulfuric acid and the crude perfluoro(dimethylethyl)carbinol, in an amount of 30 parts, was separated. The crude product was then distilled from 100 parts of concentrated sulfuric acid, giving 25 parts of pure perfluoro(dimethylethyl)carbinol, B.P. 67° C.

Since it is obvious that many changes and modifications can be made in the above-described details without departing from the nature and spirit of the invention, it is to be understood that the invention is not to be limited to said detail except as set forth in the appended claims.

The embodiments of the invention in which an exclusive property or privilege is claimed are defined as follows:

1. A process for preparing an alkali metal salt of the structure

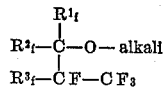

which comprises contacting at about 20° C. to about 175° C. a perfluoroketone of the structure $R^1_f$—CO—$R^2_f$ with a perfluoroolefin of the structure $R^3_fCF=CF_2$ and the compound MF, wherein M represents an alkali meal, in a solvent having a melting point below 20° C. and selected from the group consisting of polyethers having the structure $RO(C_pH_{2p}O)_nR$ and nitriles having the structure R'CN, wherein $R^1_f$ and $R^2_f$ are perfluoroalkyl groups which together contain from 2 to 20 carbon atoms, $R^3_f$ is selected from the group consisting of fluorine and trifluoromethyl, R is a lower alkyl group of one to four carbon atoms, p is an integer of two to four, n is an integer of one to four, and $R^1$ is a hydrocarbon group free of aliphatic unsaturation, and recovering said alkali metal salt from the reaction mixture.

2. A process for preparing perfluoro-tertiary-alkanols which comprises (A) the step of contacting at about 20° C. to 175° C. a perfluoroketone of the structure $R^1_f$—CO—$R^2_f$, wherein $R^1_f$ and $R^2_f$ are perfluoroalkyl groups which together contain from 2 to 20 carbon atoms, with a perfluoroolefine of the structure $R^3_fCF=CF_2$, wherein $R^3_f$ is a member of the group selected from fluorine and trifluoromethyl, and the compound MF, wherein M represents an alkali metal, in a solvent having a melting point below 20° C. and selected from the group consisting of polyethers having the structure $$RO(C_pH_{2p}O)_nR$$

and nitriles having the structure R'CN, wherein R is a lower alkyl group of one to four carbon atoms, p is an integer of two to four, n is an integer of one to four and $R^1$ is a hydrocarbon group free of aliphatic unsaturation, and (B) the step of converting the alkali metal salt product formed in step (A) to the free perfluoro-tertiary-alkanol, having the structure

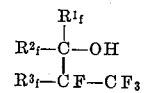

wherein $R^1_f$, $R^2_f$ and $R^3_f$ are the same as above.

3. The process of claim 2 wherein the alkali metal fluoride is cesium fluoride and the solvent is diethyleneglycol dimethyl ether.

4. The process of claim 2 wherein the alkali metal is potassium fluoride and the solvent is diethyleneglycol dimethyl ether.

5. The process of claim 2 wherein the alkali metal fluoride is sodium fluoride and the solvent is diethyleneglycol dimethyl ether.

6. The process of claim 2 wherein the solvent is acetonitrile.

7. A process for preparing the perfluoro-tertiary-alkanol having the structure

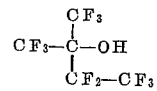

which comprises (A) the step of contacting at about 20° C. to 175° C. hexafluoroacetone with tetrafluoroethylene and cesium fluoride in diethyleneglycol dimethyl ether, removing the solvent from the reaction mixture to obtain a dried product preparing a slurry of the dried product with sulfuric acid, and recovering from the slurry said perfluoro-tertiary-alkanol.

8. The process for preparing the perfluoro-tertiary-alkanol having the structure

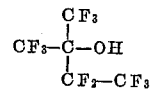

which comprises preparing a mixture of cesium fluoride and diethyleneglycol dimethyl ether in a closed reaction vessel, then adding hexafluoroacetone in increments to said mixture at room temperature while maintaining the pressure in said vessel below 25 p.s.i.g., thereafter adding tetrafluoroethylene in increments to said vessel at 95° C. to 100° C. while maintaining the pressure below 25 p.s.i.g., then cooling the mixture and evaporating said solvent to obtain the dried product, preparing a slurry of said dried product with sulfuric acid, and recovering from the slurry said perfluoro-tertiary-alkanol.

References Cited by the Applicant

UNITED STATES PATENTS 3,113,967  12/1963  Fawcett.

LEON ZITVER, *Primary Examiner.*

H. MARS, *Assistant Examiner.*